Jan. 27, 1959  J. H. EPPLER  2,870,803
COOPERAGE BOLT SAWING MACHINE
Filed May 29, 1956  6 Sheets-Sheet 4
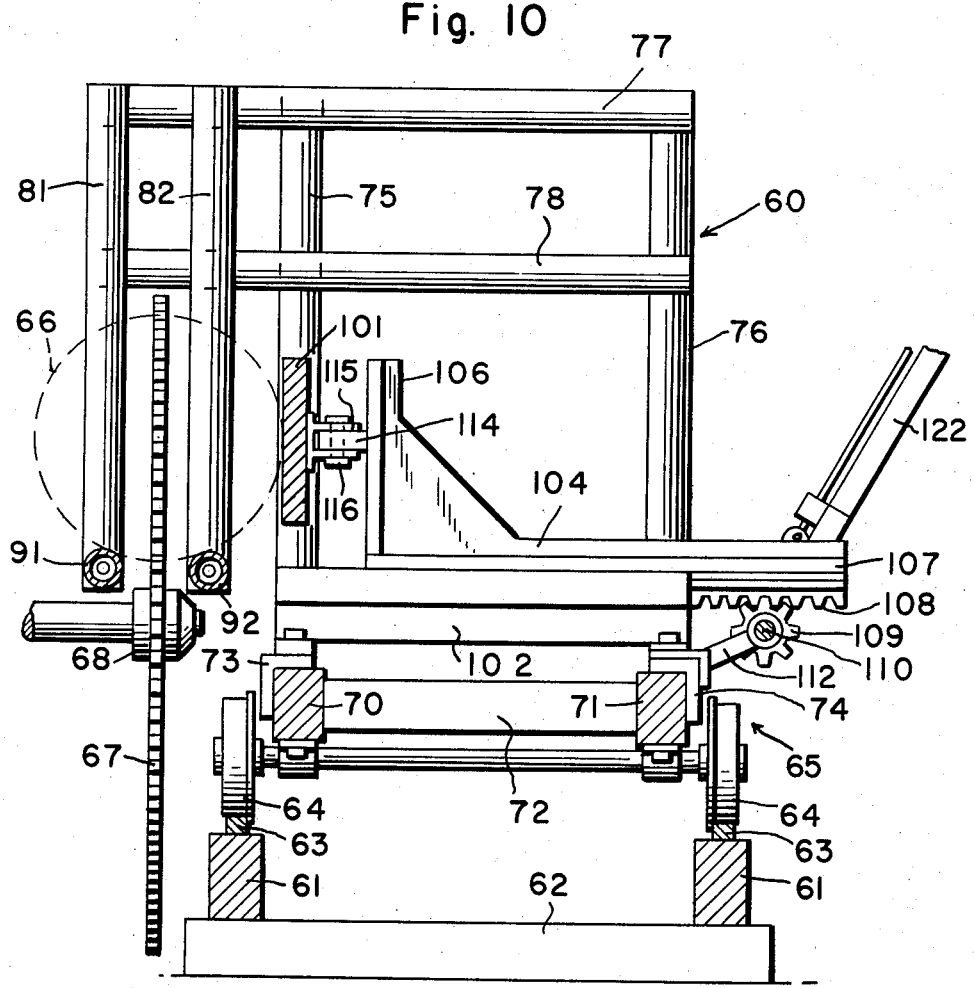
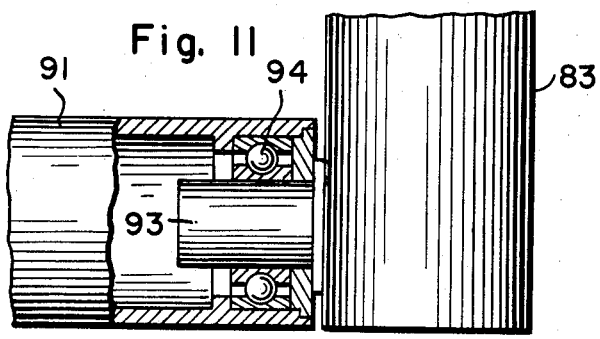
INVENTOR.
JOHN H. EPPLER
BY Walter G. Finch
ATTORNEY Jan. 27, 1959 J. H. EPPLER 2,870,803
COOPERAGE BOLT SAWING MACHINE
Filed May 29, 1956 6 Sheets-Sheet 5
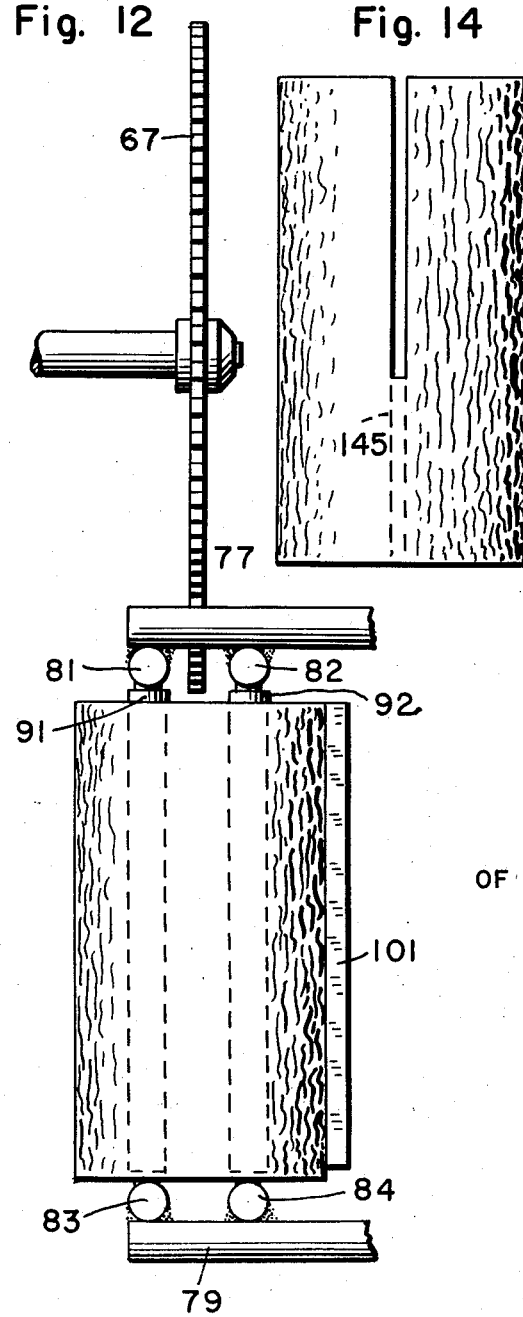
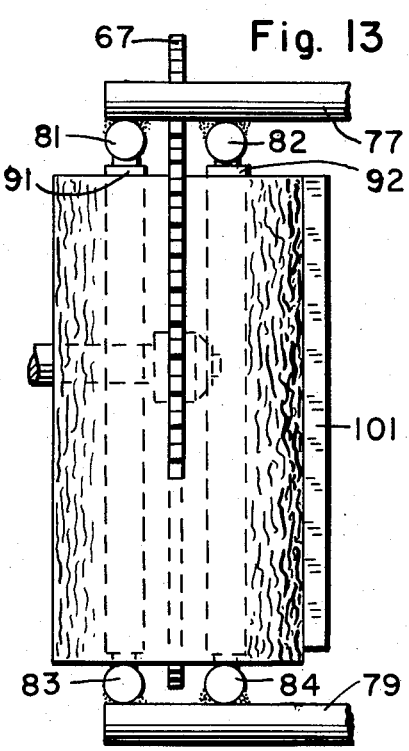
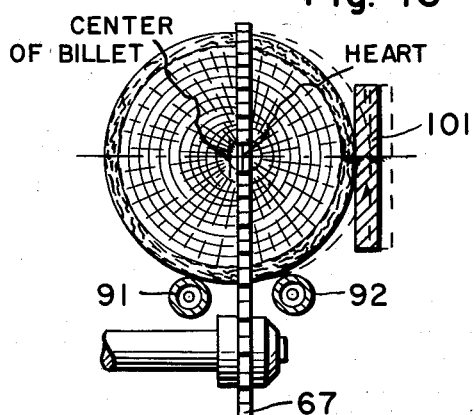
INVENTOR.
JOHN H. EPPLER
BY Walter G. Finch
ATTORNEY

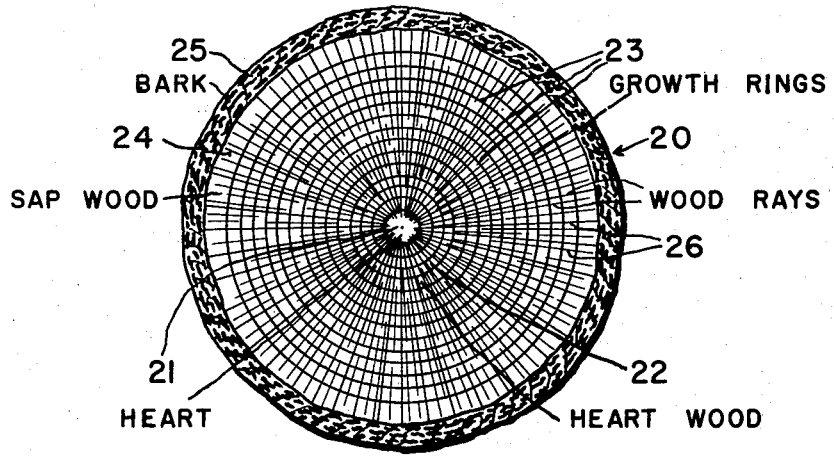
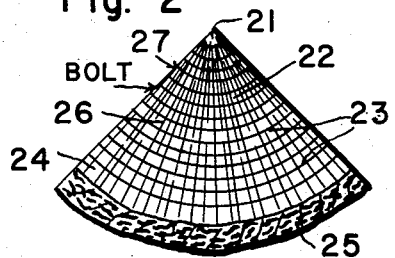
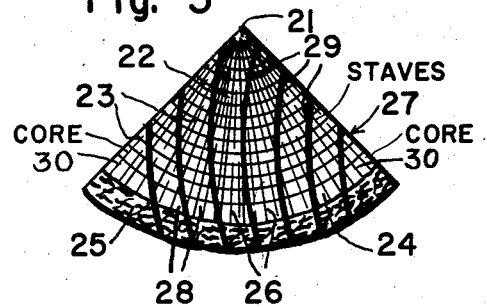
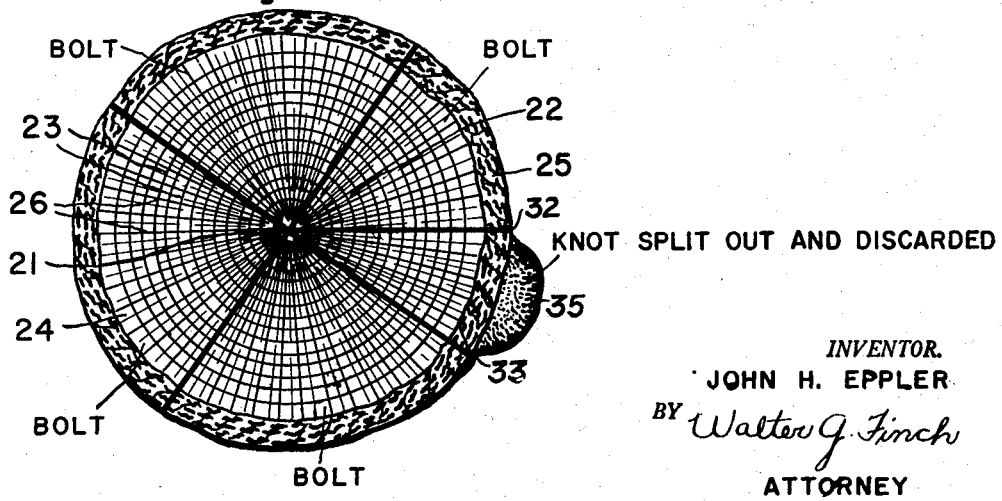

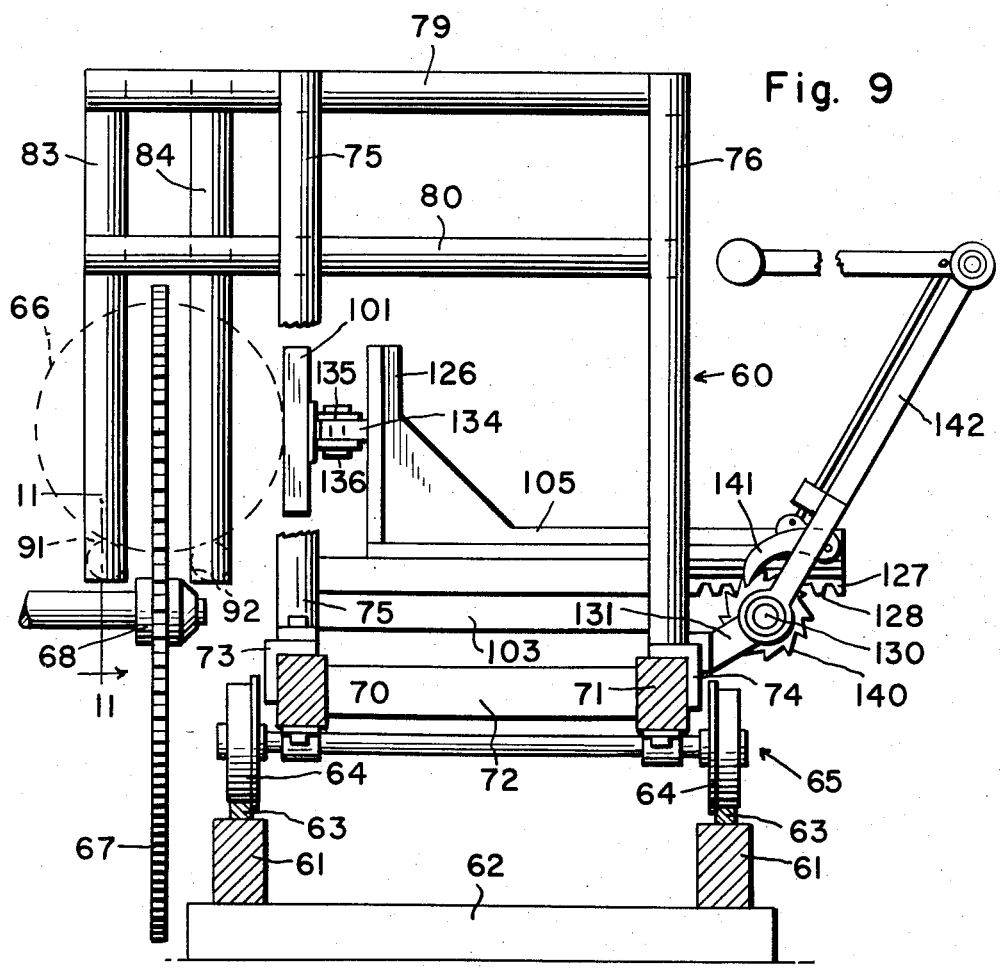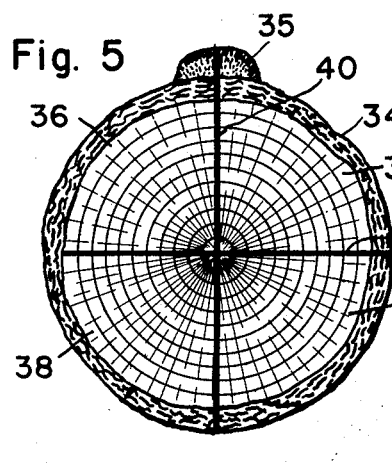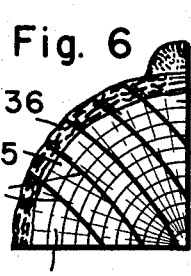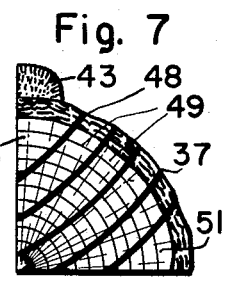

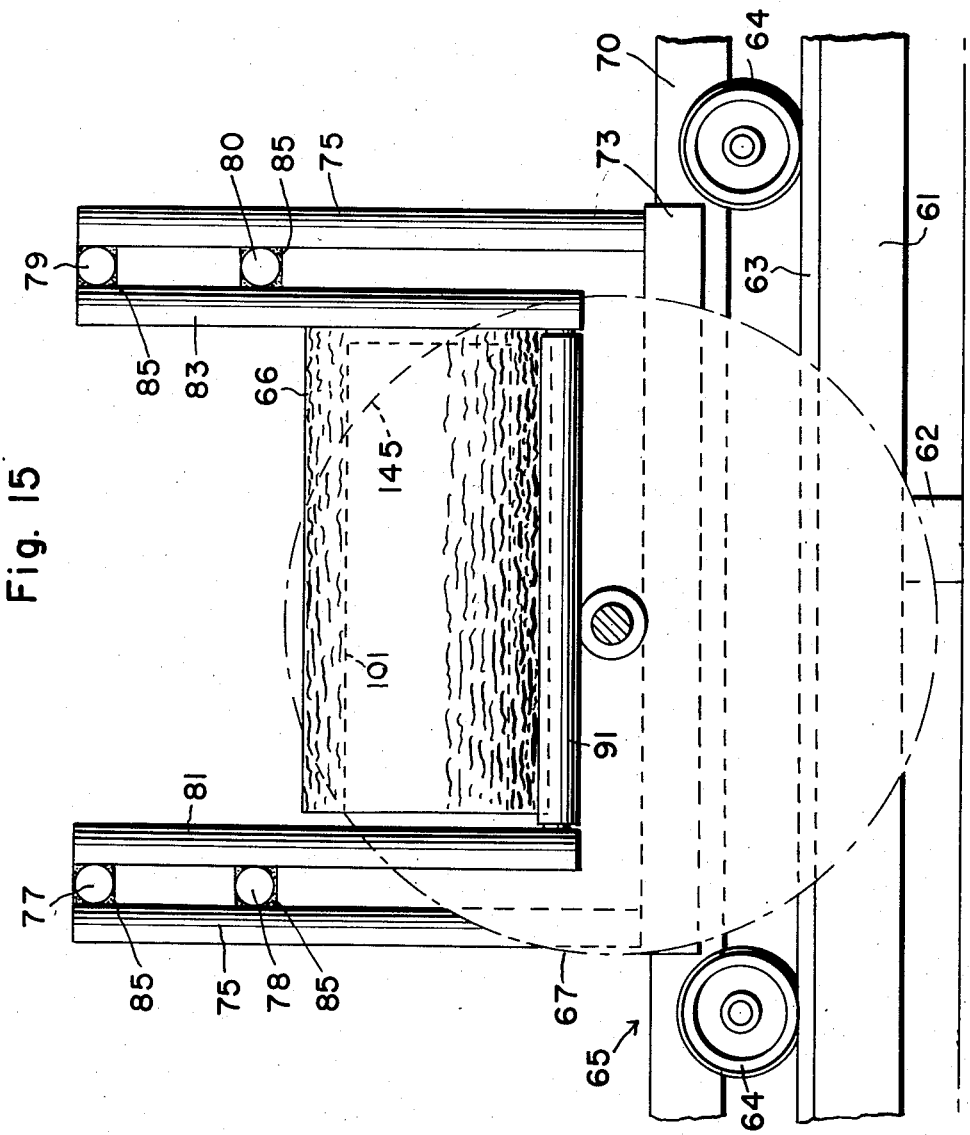

United States Patent Office 2,870,803
Patented Jan. 27, 1959

2,870,803

COOPERAGE BOLT SAWING MACHINE

John H. Eppler, Dorsey, Md., assignor to Eppler Wood Products Corporation, Dorsey, Md., a corporation of Maryland Application May 29, 1956, Serial No. 588,050

2 Claims. (Cl. 143—54)

This invention relates to the manufacture of stave and heading bolts for the cooperage industry.

An object of the present invention is to provide a new and improved apparatus by which logs and billets can be quickly sawed into bolts from which staves and heading of barrels are formed.

Another object of the invention is to provide a new and improved saw mill especially designed to saw-out bolts from logs or billets of white oak timber.

A further object of the invention is to provide a new and improved saw mill by which logs or billets of relatively large diameter can be quickly sawed into a plurality of bolts.

A still further object of the invention is to provide a new and improved saw mill having a cradle for supporting logs or billets of various sizes from both sides of the saw.

A further object of the invention is to provide a new and improved saw mill of the above type having means by which the relative position of the logs or billets can be quickly shifted to properly center the log with respect to the saw.

Another object of the present invention is to provide a new and improved saw mill of the above type having means by which the logs or billets are supported from both sides of the saw so as to be rotatable about their longitudinal axis to produce a number of bolts in excess of two.

A further object of the invention is to provide a new and improved saw mill of the above type which is simple in construction, and reliable and efficient in operation.

With the foregoing and other objects and advantages in view, the invention consists in the preferred construction and arrangement of the several parts which will be hereinafter fully described and claimed.

For a clearer understanding of the invention and the objects thereof, reference is made to the accompanying drawings, wherein a particular form of the invention is indicated. These drawings when used in conjunction with the following description serve to illustrate the invention, its principles and the operation thereof, while the claims indicate the scope thereof.

In the drawings:

Fig. 1 is an end view of a white oak billet showing the structure thereof preparatory to the production of barrel staves therefrom in accordance with the present invention;

Fig. 2 is an end view of a bolt cut from the billet of Fig. 1 in accordance with the present invention;

Fig. 3 is an end view of the bolt of Fig. 2 showing the manner in which the barrel staves are formed therefrom;

Fig. 4 is an end view of a billet having a relatively large knot, showing the manner in which the bolts are formed without utilizing the knotty portion thereof;

Fig. 5 is an end view of a white oak billet having a knot thereon, showing the manner in which the billet is divided into bolts according to the present invention;

Fig. 6 is an end view of one of the bolts shown in Fig. 5 containing part of the knot;

Fig. 7 is an end view of the other bolt shown in Fig. 5 containing part of the knot;

Fig. 9 (Sheet 2) is a vertical transverse section taken along the line 9—9 of Fig. 8, parts being broken away to show the underlying structure;

Fig. 10 (Sheet 4) is a vertical transverse section taken along the line 10—10 of Fig. 8;

Fig. 11 is a vertical section taken along the line 11—11 of Fig. 9;

Fig. 12 is a fragmentary plan view showing the billet positioned for the first quartering operation;

Fig. 13 is a view of the parts shown in Fig. 12, at the completion of the first quartering operation;

Fig. 14 is a plan view of the billet of Fig. 13 removed from the apparatus;

Fig. 15 is a vertical section taken along the line 15—15 of Fig. 8 showing the parts in the first quartering position shown in Fig. 13; and Fig. 16 (Sheet 5) is a detail vertical transverse section showing the manner in which a billet is positioned in the apparatus when the heart of the wood is off center.

Figure 8:
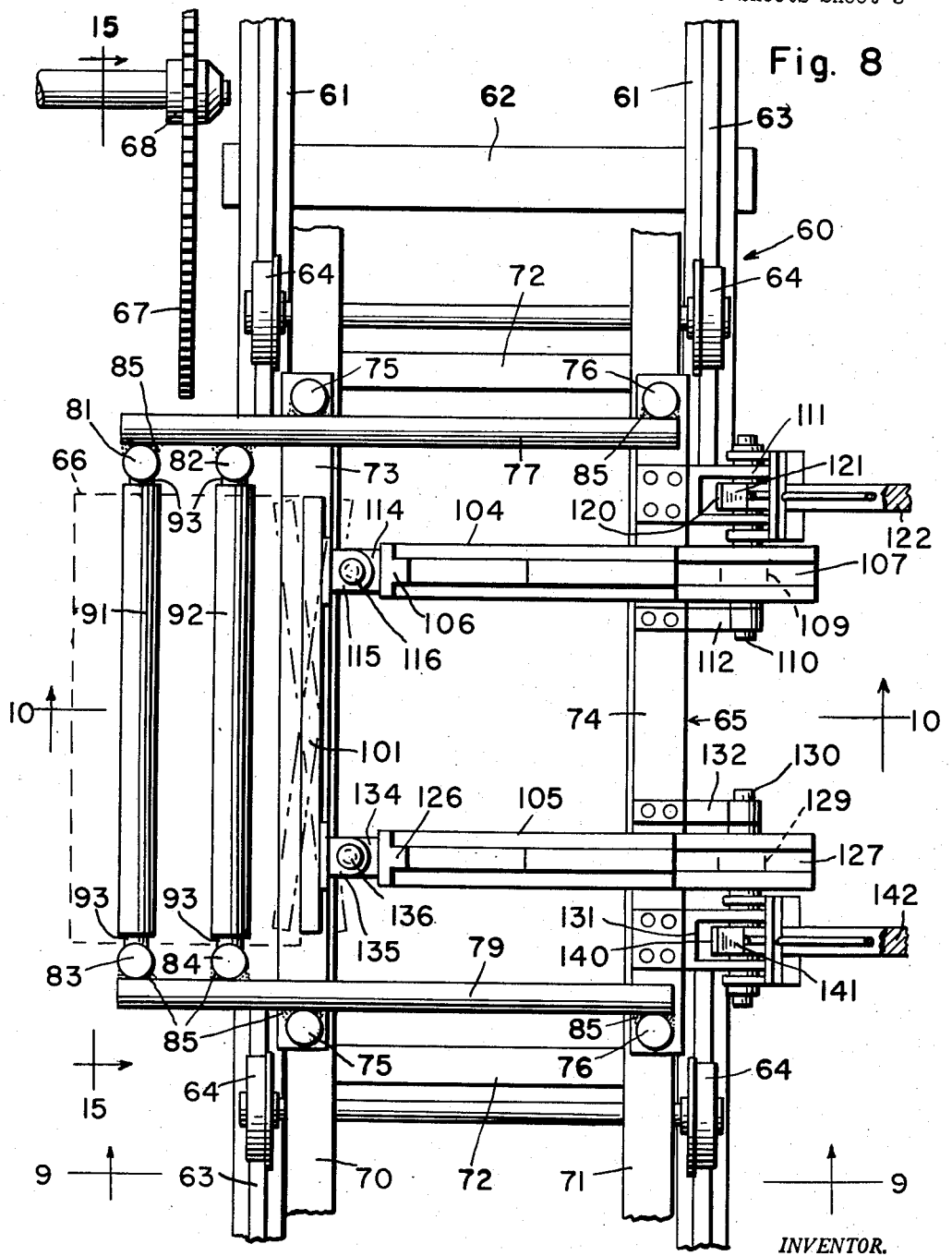
Fig. 8 is a top plan view of a saw mill embodying the present invention, the billet being shown by broken lines and the carriage being shown in position to pass the billet through the saw.

In the manufacture of wooden barrels, the staves and heading may be produced from white oak (*Quercus alba*) timber. Since this wood has certain physical characteristics which are different from other woods, it is necessary to follow definite steps in order to produce the rough blocks from which the staves and heading are formed.

As shown in Fig. 1, it will be noted that at the center of a white oak log or billet 20, there is the usual heart 21, which is surrounded by the heart wood 22, the progressive growth of the tree being indicated by the growth rings 23, which are arranged outwardly at varying distances apart, from the heart 21 to the sap wood 24, the latter being enclosed by bark 25. Extending radially from the heart 21 outwardly to the bark 25 are many wood rays 26. These wood rays may be of various lengths, and especially in the case of healthy white oak trees, they may be mostly very fine.

In addition to being produced from white oak timber, the staves and heading must be quarter sawn, that is, sawed from the log in a plane substantially parallel to the wood rays 26. Thus it becomes apparent that the log or billet 20 (thirty-nine inches in length for staves, twenty-four inches in length for heading) must be broken into bolts 27 to permit staves and heading to be sawn from a radial plane. An ideal size bolt 27 is illustrated in Fig. 2, and the manner in which staves 28 are cut from the bolt is illustrated in Fig. 3 by the lines 29. It will be noted that several staves 28 can be obtained from each bolt 27 between the cores 30, which constitute two relatively small pieces of waste material that are usually discarded.

Staves are the sides of barrels, while the heading is used to make the tops and bottoms of the barrels. Staves and heading alike must be free of all defects. Defects usually found in white oak timber are: knots, bird pecks, mineral streaks, water soak, excessive sap, shake, worm and grub holes, and spike knots.

In the production of staves and heading the only defect the manufacturer has any control over is the knot. In producing the bolts 27, the knot, such as that indicated at 35, Fig. 4, can be eliminated by the proper splitting of the billet.

Heretofore, standard practice throughout the cooperage industry has been to produce bolts by splitting the billets with hammers and wedges. In splitting by hand, it is not possible to split through the knots but only along side of them, as indicated by the lines 32 and 33, Fig. 4. Therefore, the core that does not contain any of them now is waste.

According to the present invention means are provided to saw-out bolts instead of producing bolts by hand splitting with hammers and wedges. As will be hereinafter more fully described, with the present invention, billets of relatively small diameter, such as those not more than twelve to fourteen inches in diameter may be sawn in half to produce two bolts from which staves and heading are formed. On the other hand, all larger timber is adapted to be sawed twice without the necessity of removing the billets from the apparatus in order to produce four bolts. Furthermore, as shown in Figs. 5, 6 and 7, with the present invention it is possible to divide a billet 34 containing a knot 35 into a plurality of bolts 36, 37, 38 and 39, by sawing through the billet 34 in the manner indicated by the lines 40 and 41, which are arranged substantially at right angles to each other, and have one half 42 of the knot a part of the bolt 36, and the other half 43 of the knot a part of the bolt 37. Thus, when the bolt 36 is sawn along the lines 44 to produce the staves 45, and the cores 46 and 47, the knotty part 42 becomes part of the core 46. In a similar manner, when the bolt 37 is sawn along the lines 48 to produce the staves 49, and the cores 50 and 51, the knotty part 43 becomes part of the core 50. By producing the bolts in this manner much timber will be saved since the cores are always waste.

Referring to Figs. 8, 9, 10 and 15, the new and improved apparatus of the present invention may comprise a saw mill, generally indicated at 60, and including the usual ways 61, supported on cross ties 62, and provided with rails 63 for the wheels 64 of a carriage 65, adapted to support a log or billet, indicated by broken lines 66, and carry the billet toward and away from a saw 67, arranged in spaced relation adjacent one side of the carriage.

The saw 67 is provided with the usual mandrel 68 which is operatively connected to a suitable power means (not shown) by which the saw is operated in well known manner to cut the log or billet 66 in a direction lengthwise of the log.

The carriage 65 comprises longitudinal wooden side members 70 and 71 which are rigidly connected together by wooden cross pieces 72. The side member 70 of the carriage is arranged in suitable spaced relation to the saw 67 and the side member 71 is spaced outwardly from the side member 70 to give the carriage the desired width. The carriage may have any length desired and its wheels 64 may be spaced apart a suitable distance lengthwise thereof, as shown in Fig. 8.

The member 70 of the carriage 65 has an angle bar 73 mounted thereon with one side of said angle bar resting on top of the member and the other side of said angle bar abutting the side of said member facing the saw 67.

The member 71 of the carriage 65 has an angle bar 74 mounted thereon, with one side of said angle bar resting on top of the member and the other side of said angle bar abutting the outer side of said member.

An upright post 75 is mounted at each end of the angle bar 73 and similar posts 76 are mounted at the ends of the angle bar 74. These posts 75 and 76 are of suitable height.

Connected to the posts 75 and 76 at one end of the angle bars 73 and 74 is a pair of substantially horizontal bars 77 and 78, and connected to the posts 75 and 76 at the other end of the angle bars 73 and 74 is another pair of substantially horizontal bars 79 and 80. The bars 77 and 79 are located adjacent to the upper ends of the posts 75 and 76, and the bars 78 and 80 are spaced downwardly a suitable distance below the upper bars 77 and 79, as shown best in Fig. 15.

The bars 77, 78, 79 and 80 extend from the posts 76 across the carriage 65, past the posts 75 and terminate a suitable distance beyond the latter posts, as shown best in Figs. 9 and 10.

Connected to the outer ends of the horizontal bars 77 and 78 is a downwardly extending substantially vertical bar 81. Also connected to the horizontal bars 77 and 78 and spaced a suitable distance inwardly thereof from the bar 81, is another downwardly extending substantially vertical bar 82.

Connected to the outer ends of the horizontal bars 79 and 80 is a downwardly extending substantially vertical bar 83. Also connected to the horizontal bars 79 and 80 and spaced a suitable distance inwardly thereof from the bar 83, is another downwardly extending substantially vertical bar 84.

As seen best in Figs. 9 and 10, the horizontal bars 78 and 80 are located in a plane above the upper peripheral edge of the saw 67. It will also be noted that the vertical bars 81 and 83 are located in spaced relation to the side of the saw 67 farthermost away from the carriage 65, and the vertical bars 82 and 84 are located in the space between the saw and the carriage. Since the vertical bars are connected only at their upper portions to the horizontal bars, a space will be provided between the vertical bars 81 and 83, and the vertical bars 82 and 84 through which space the saw 67 can freely pass when the carriage 65 moves lengthwise of the ways 61 past the saw.

The upright posts 75 and 76 and the bars 77, 78, 79, 80, 81, 82, 83 and 84 may be constructed of any suitable structural steel members and the several members can be fixedly secured together in any desired manner, such as by welding, as indicated at 85 in the several views of the drawings. As so constructed the parts 75 to 84, inclusive, constitute a cantiliver frame for carrying the log or billet supporting means of the present invention.

In order to support a log or billet so that it can be sawed into bolts in the manner heretofore described, suitable supporting means in the form of a cradle composed of a pair of substantially horizontally disposed rollers 91 and 92 are provided, the roller 91 being carried by the vertical bars 81 and 83 and the roller 92 being carried by the vertical bars 82 and 84, respectively.

The rollers 91 and 92 should be freely rotatable, and for this purpose any suitable means may be provided for supporting said rollers from the cantiliver frame.

One such roller supporting means is shown in Fig. 11, wherein the lower end of vertical bar 83 has a stud 93 projecting therefrom and extending into an end of roller 91, said stud carrying an anti-friction bearing 94 which in turn supports the end of the roller.

The construction and arrangement of the parts should be such that the saw 67 is arranged to pass at equal distances between the rollers 91 and 92.

When a billet is loaded on to the carriage 65 for the purpose of dividing it into the bolts, it is rolled into the cradle provided by the rollers 91 and 92. Prior to passing a billet across the saw, the billet must be aligned on the cradle in such a manner that the saw will pass through the heart. If the diameter of a billet is twelve to fourteen inches, the billet should only be cut into two parts. All larger timber, after being properly positioned on the cradle, is first passed part way through the saw and then retracted leaving a few inches of wood at the trailing end of the billet uncut for the purpose of holding the two halves intact. The billet is then rotated 90 degrees about its axis with a cant hook (not shown) and passed completely through the saw, producing four bolts, after the small uncut sections are split out by hand.

Since the cradle provided by the rollers 91 and 92 constitutes the means for supporting a billet, the usual headblock dogs of a saw mill are not needed. However, in order to retain a billet in its centered position with respect to the saw 67, an adjustable headblock 101 is provided. This headblock comprises a relatively large substantially rectangular member arranged in a substantially vertical position so as to present a broad face for bearing lengthwise against the outside of a billet.

In order to support the headblock 101 in an elevated position with respect to the main body of the carriage 65, a pair of guide members 102 and 103 are mounted transversely of the side members 70 and 71 in suitable spaced relationship between the ends of the headblock 101, as shown in Fig. 8.

Associated with the guide members 102 is a setworks 104, and associated with the guide members 103 is a setworks 105.

The setworks 104 comprises an L or knee having an upstanding portion 106 at the end thereof nearest to the headblock 101, and a rack portion 107 slidably mounted on the guides 102 and provided with teeth 108 which mesh with the teeth of a pinion 109 on a shaft 110 supported from the side member 71 of the carriage 65 by bearing brackets 111 and 112 (see Figs. 8 and 10).

Projecting outwardly from the upstanding portion 106 of the L is a bracket 114 which is pivotally connected to a yoke 115 carried by the headblock 101 by means of a pin 116 so as to provide a swivel connection between the headblock and the L 106.

Mounted on the shaft 110 is a ratchet wheel 120 having teeth engageable by a pawl 121 arranged to communicate the motion of a handle 122 whereby the pinion 109 is rotated to move the L 106 outwardly and inwardly of its guides 102 and thereby shift the relative position of the end portion of the headblock 101 to which the yoke 115 is mounted.

The setworks 105 is similar in construction with the construction of the setworks 104, and comprises an L having an upstanding portion 126 at the end thereof nearest to the headblock 101, and a rack portion 127 slidably mounted on the guides 103 and provided with teeth 128 which mesh with the teeth of a pinion 129 on a shaft 130 supported from the side member 71 of the carriage 65 by bearing brackets 131 and 132 (Figs. 8 and 9).

Projecting outwardly from the upstanding portion 126 of the L is a bracket 134 which is pivotally connected to a yoke 135 carried by the headblock 101, by means of a pin 136 so as to provide a swivel connection between the headblock and the L.

Mounted on the shaft 130 is a ratchet wheel 140 having teeth engageable by a pawl 141 arranged to communicate the motion of a handle 142 whereby the pinion 129 is rotated to move the L 126 outwardly and inwardly of its guides 103.

In operation, when a billet is rolled into the cradle provided by the rollers 91 and 92, the billet is aligned on the cradle in order to center the heart thereof with the saw 67. The headblock 101 is set tightly against the side of the billet in the manner shown in Fig. 12. Due to the provision of the two spaced apart rollers 91 and 92 and the headblock 101 it will be understood that the billet will be held firmly in position on the carriage 65, with an end of the billet abutting the stops provided by the two vertical bars 83 and 84.

The carriage 65 is then moved lengthwise of the ways 61 to cause the billet to pass part way through the saw 67, in the manner shown best in Figs. 13 and 15, thereby leaving a few inches of wood at the trailing end of the billet uncut for the purpose of holding the two halves intact, as indicated by the broken lines 145 in Fig. 14.

The carriage 65 is then returned to the position shown in Fig. 8 and the billet is rotated 90 degrees about its axis with a cant hook (not shown) and passed completely through the saw 67, producing four bolts.

When a billet has a knot on its surface, such as the knot 35 of the billet 34 of Fig. 5, the billet is rolled onto the cradle provided by the rollers 91 and 92 and rotated about its axis with a cant hook (not shown) until the knot 35 is straight up, as shown in Fig. 5. The first cut is then made along the line 40 to partly sever the log, after which the billet is rotated 90 degrees about its axis and passed completely through the saw 67 along the line 41, thereby producing four bolts in the manner heretofore described.

When the heart 21 of a billet is eccentrically disposed, the headblock 101 should be shifted to center the heart of the billet with the saw 67, in the manner shown in Fig. 16. As here shown, it will be noted that the headblock 101 has been shifted from its normal true center position illustrated by broken lines in order to bring the heart 21 of the billet into such position that the saw will pass therethrough. In this position of the headblock 101 the billet will be supported by the roller 91 at the opposite or far side of the saw.

From the foregoing it will be noted that the present invention provides a new and improved means by which stave and heading bolts can be quickly and economically produced for the cooperage industry. It will be obvious that the greatest advantage of the present invention is the vast saving in labor required to produce bolts as compared to hand splitting. Also the present invention effects a saving in timber since it is possible to saw through a knot and have each half of the knot become part of the core which is always waste. In splitting by hand, it is not possible to split through knots but only along side of them, therefore, the core that does not contain any knot is waste that is otherwise not lost in sawing through the knot.

In comparing the present invention to attempting to bolt on a conventional saw mill by employing the headblocks and dogs, the means of the present invention provide many advantages.

First, it is considerably quicker, easier and less labor involved to roll a billet into the cradle provided by the rollers 91 and 92 than it is to place a billet on the headblocks and have to set dogs (four required) in the billet. Prior to placing the billet on the headblocks, the knees must be receded, which is an additional operation not required by the present invention.

Second, the present invention greatly facilitates the turning of a billet after the first pass as it is cradled on the rollers 91 and 92 and a gentle pull on a cant hook is all that is required to effect this operation. In the usual saw mill, it is necessary to release the dogs, turn the billet on the headblocks, which are flat surfaces, then reset the dogs.

Third, by the present invention the billet is supported from both sides of the saw and consequently has positive restraint in the direction of the forces transmitted from the saw.

Fourth, producing bolts on the usual saw mill and utilizing the headblocks and dogs, it is necessary to remove one-half of the billet from the carriage after the first pass through the saw. This is necessary because the billet is cantilevered beyond the end of the headblocks and there is nothing to support the cantilevered half once it has been passed through the saw and separated from the half that is dogged. By the present invention, the billet is held in one piece and intact until the final pass through the saw when it is separated into halves or quarters.

It is obvious, therefore, that the present invention requires less handling of the billet, is quicker, requires less labor, is foolproof, is simple to operate, can be operated by unskilled labor, and has very few moving parts to wear.

While a preferred form of the invention is shown in the drawings and described in the specification, it is not desired to limit this application for patent to this particular form, as it is appreciated that other forms of construction could be made that would use the same principles and come within the scope of the appended claims.

Having thus described the invention what is claimed is:

1. A cooperage bolt sawing machine, comprising, a saw blade mounted for rotary movement, a motor mechanically coupled to said saw for powering said saw for rotary movement, a carriage having two pairs of wheels and having its direction of movement arranged parallel to the plane containing said saw, a pair of spaced tracks, said pairs of wheels being positioned on said spaced tracks for movement of said carriage along said tracks; a cantilever frame carried by said carriage and extending laterally therefrom over and above said saw, said frame consisting of first and second pairs of members extending vertically from said carriage, with said first and second pairs of said members being located at opposite ends of said carriage, each member of said first and second pairs of said members being positioned on opposite sides of said carriage, third and fourth pairs of members extending horizontally from said carriage, said third and fourth pairs of members being secured to said first and second pair of members, respectively, and spaced an equal distance apart, said third and fourth pairs of members extending outwardly past the vertical plane of said saw an equal distance, the lowermost members of said third and fourth pairs of members being located in a plane above the upper edge of said saw, and fifth and sixth pairs of members extending downwardly from the overhanging ends of said third and fourth pairs of members, respectively, and secured thereto, said outwardmost members of said fifth and sixth pairs of members and the innermost members thereof being positioned apart and located on opposite sides of said saw an equal distance, with the innermost members of said fifth and sixth pairs of members being located between said saw and said carriage, and a roller positioned between the lower ends of the outermost members and another roller between the lower ends of the innermost members of said fifth and sixth pairs of members for supporting a log to be cut into bolts, with said rollers being arranged to support said billet at equal points on both sides of said saw, whereby when said carriage is moved on its pair of spaced tracks, said billet can be rotated for cutting into bolts by said blade.

2. A cooperage bolt sawing machine, comprising; a saw blade mounted for rotary movement, a motor mechanically coupled to said saw for powering said saw for rotary movement, a carriage having two pairs of wheels and having its direction of movement arranged parallel to the plane containing said saw, a pair of spaced tracks, said pairs of wheels being positioned on said spaced tracks for movement of said carriage along said tracks; a cantilever frame carried by said carriage and extending laterally therefrom over and above said saw, said frame consisting of first and second pairs of members extending vertically from said carriage, with said first and second pairs of said members being located at opposite ends of said carriage, each member of said first and second pairs of said members being positioned on opposite sides of said carriage, third and fourth pairs of members extending horizontally from said carriage, said third and fourth pairs of members being secured to said first and second pair of members, respectively, and spaced an equal distance apart, said third and fourth pairs of members extending outwardly past the vertical plane of said saw an equal distance, the lowermost members of said third and fourth pairs of members being located in a plane above the upper edge of said saw, and fifth and sixth pairs of members extending downwardly from the overhanging ends of said third and fourth pairs of members, respectively, and secured thereto, said outwardmost members of said fifth and sixth pairs of members and the innermost members thereof being positioned apart and located on opposite sides of said saw an equal distance, with the innermost members of said fifth and sixth pairs of members being located between said saw and said carriage, and a roller positioned between the lower ends of the outermost members and another roller between the lower ends of the innermost members of said fifth and sixth pairs of members for supporting a log to be cut into bolts, with said rollers being arranged to support said billet at equal points on both sides of said saw, and means including a sliding carriage for positioning said billet with respect to the plane of said saw.

References Cited in the file of this patent
UNITED STATES PATENTS

| Number | Name | Date |
|---|---|---|
| 159,999 | Bellows | Feb. 23, 1875 |
| 436,420 | Hodgson | Sept. 16, 1890 |
| 1,073,969 | Dueysen | Sept. 23, 1913 |
| 1,381,183 | Gray | June 14, 1921 |
| 1,420,961 | Brady | June 27, 1922 |
| 1,588,969 | Lemmer | June 15, 1926 |
| 2,011,037 | Cook | Aug. 13, 1935 |
| 2,232,416 | Taylor et al. | Feb. 18, 1941 |
| 2,664,926 | Fuglie | Jan. 5, 1954 |
| 2,778,392 | Peterson | Jan. 22, 1957 |